Figure 1:
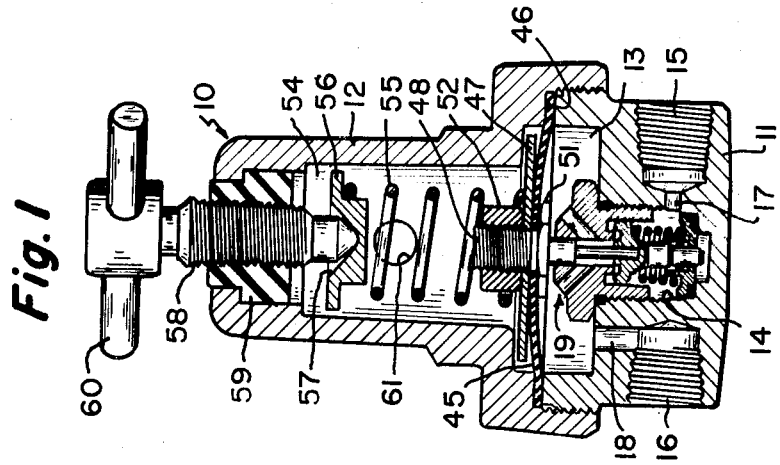

United States Patent [19]
Kongelka

[11] 3,759,294
[45] Sept. 18, 1973

[54] PRESSURE REGULATOR

[75] Inventor: Robert M. Kongelka, Washington, Pa.

[73] Assignee: Superior Valve Company, Washington, Pa.

[22] Filed: June 7, 1972

[21] Appl. No.: 260,546

[52] U.S. Cl...... 137/612.1, 137/505.18, 137/505.42
[51] Int. Cl............................................. F16k 17/04
[58] Field of Search................. 137/505.18, 505.42, 137/612.1

[56] References Cited
UNITED STATES PATENTS

| | | | |
|---|---|---|---|
| 3,075,545 | 1/1963 | Eichelman | 137/505.18 |
| 3,139,901 | 7/1964 | Camp | 137/505.18 |
| 3,586,037 | 6/1971 | Zimmer | 137/505.18 |
| 3,621,867 | 11/1971 | Johnson | 137/505.18 |

FOREIGN PATENTS OR APPLICATIONS 994,408  8/1951  France............................ 137/505.42

*Primary Examiner*—Harold W. Weakley
*Attorney*—Buell, Blenko et al.

[57] ABSTRACT

The specification discloses a pressure regulating valve device for regulating to a relatively low uniform delivery pressure a high-pressure supply of fluid, such as a gas. The valve device includes a release valve arrangement which effects the release of high-pressure fluid that is undesirably trapped in the valve device due to leakage past a seal, such as O-ring seals, associated with a valve stem. The release valve arrangement operates responsively to shut-off of the supply of pressure to vent the trapped fluid via the normal delivery passages of the valve device.

3 Claims, 2 Drawing Figures

PATENTED SEP 18 1973

3,759,294

PRESSURE REGULATOR

This invention relates to pressure regulating valve devices, particularly of the type in which the valve device regulates to a relatively low delivery pressure a fluid, such as a gas, the supply pressure of which is relatively high. Valves of this type are commonly used, for example, in regulating the pressure of oxygen delivered from highly pressurized tanks to respiratory equipment in hospitals and to welding equipment.

Gas pressure regulating valves of the type for delivering gas at relatively low pressures, such as in the 15–20 p.s.i. range from a relatively high supply pressure in the range of 2,000–3,000 p.s.i. have been known and used for many years. A common difficulty to which these valves are subject is leakage of the highly pressurized gas along valve stems past O-ring seals. Unless some provision is made for preventing such leakage or nullifying the effect of the leakage, the build-up of high pressure gas leakage in trapped volumes within the valve device can introduce an unintended pressure bias into the regulator and produce undesirable closing-off or distortion of the delivery pressure control. In order to nullify the effect of leakage, some pressure regulating valves resort to the use of a constantly open atmospheric vent port for releasing gas leakage directly to atmosphere. U.S. Pat. No. 3,286,726, issued NOv. 22, 1966 to B. L. Guy discloses a valve device which is typical of pressure regulating valves employing such an atmospheric release port.

In the case of inflammatory or explosive gases, however, the possible accumulation of released gas in a confined area becomes a safety hazard.

It is accordingly an object of this invention to provide a pressure regulating valve device of improved design which avoids the disadvantages and objections characteristic of heretofore known pressure regulating valve devices and which, in particular, avoids the release of highly-pressurized gas leakage directly to atmosphere.

More particularly, I provide a pressure regulating valve device embodying therein an arrangement for releasing highly-pressurized gas leakage from the regulating valve device through the normal delivery channels and which therefore avoids entirely the need for atmospheric vent ports, thereby obviating any possibility of safety hazard or entry of dirt into the valve itself.

Figure 2:
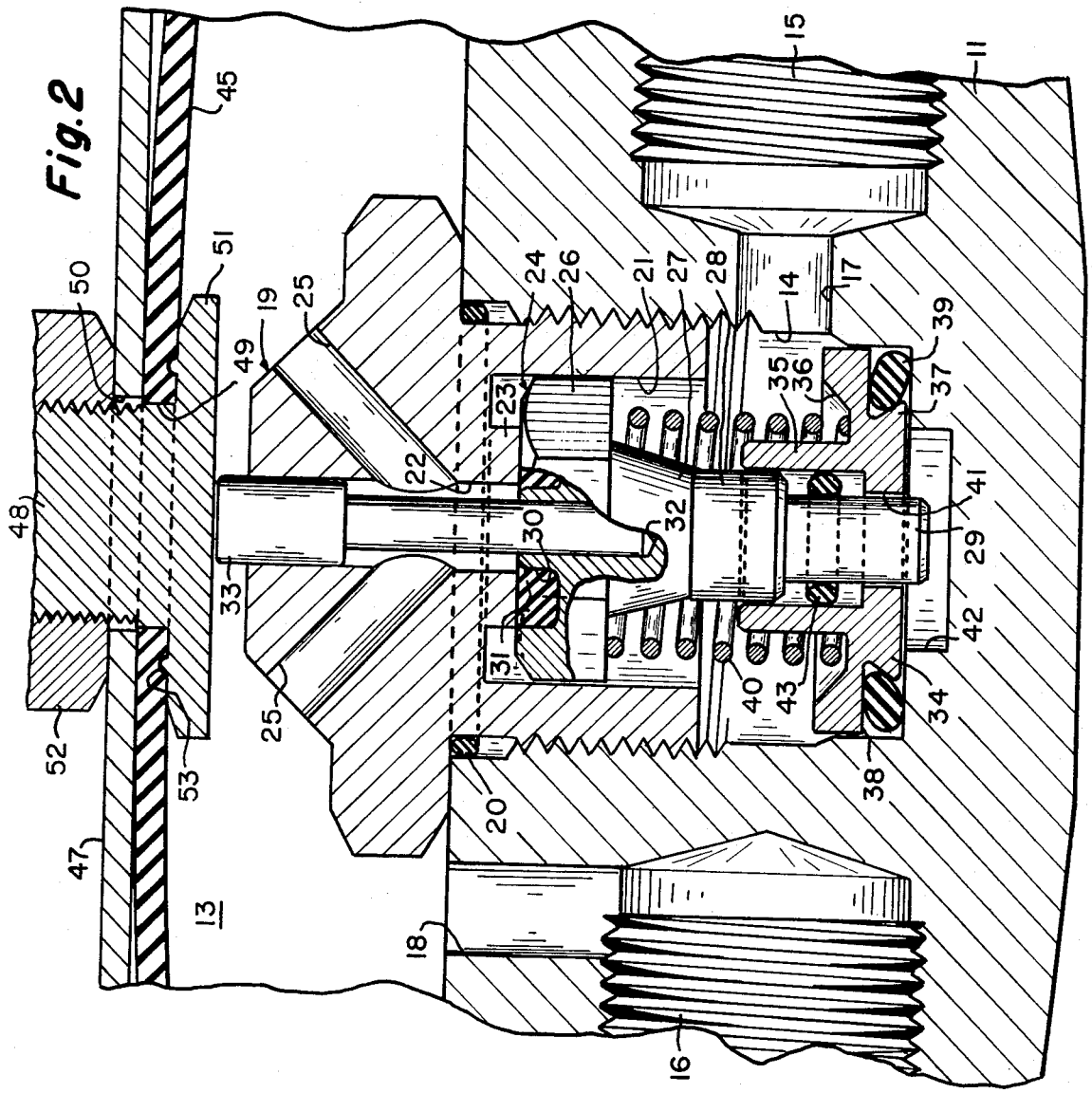

A presently preferred form of pressure regulating valve device embodying my invention will be described hereinafter in connection with the accompanying drawings, wherein:

FIG. 1 is an elevational cross-sectional view of the pressure regulating valve device; and FIG. 2 is a fragmental enlarged cross-sectional view, showing with greater clarity the salient details of the regulating valve device of FIG. 1.

Referring to the drawings, the general structure of the regulating valve device 10 embodying my invention comprises a sectionalized casing of suitable metal, such as brass, having a valve section 11 and a spring section 12, the two sections having cooperating threads by which the sections are secured together.

Valve section 11 is of cylindrical or cup shape, having a circular recess or low-pressure chamber 13 on the inner end thereof and a coaxial partly threaded bore 14 extending out of the chamber toward the bottom of the section 11.

A threaded inlet port 15 and a threaded outlet port 16 are provided in the valve section. The inlet port 15 opens into the bore 14 through an orifice 17. Outlet port 16 is connected via a short connectable 18 with the chamber 13. Pipes (not shown) are connectible to the inlet and outlet ports for conducting the high-pressure fluid to the valve device 10 and delivering it therefrom. While the inlet and outlet ports 15 and 16 are shown as being in coaxial diametric relation, it will be apparent that they may have any desired coplanar angle therebetween. Also, while omitted for simplicity, additional ports may be provided conventionally in the body of the valve section 11, communicating respectively with the inlet port 15 and with the chamber 13, for a desired purpose, such as connection of pressure or safety gauges thereto.

Mounted within the casing section 11 is a nozzle 19 comprising a threaded cylindrical portion which is screwed into the threaded portion of bore 14 and which has an integral hexagonal nut portion at one end. As will be noted especially in FIG. 2, the cylindrical portion is formed to a smooth surface adjacent the hexagonal nut portion, which surface lies in concentric spaced relation to the smooth outer portion of the bore 14. An O-ring or grommet 20 of rubber composition is disposed between the cylindrical portion and the smooth wall of the bore 14 in sealing relation.

The cylindrical portion of nozzle 19 has a cylindrical recess or bore 21 coaxial thereto, which communicates with chamber 13 via a second coaxial bore 22 of relatively smaller diameter, that is open to the outer end of the hexagonal nut portion. Formed at the bottom of recess 21 in surrounding relation to the bore 22 in an annular seat or seat ring 23 for a valve element 24, more fully described later. Opening laterally out of the bore 22 are a plurality, illustratively shown as two, of vent ports 25 which open upwardly into the chamber 13.

The valve element 24 comprises a polygonal valve head 26 and an integrally formed coaxial stem 27 having an intermediate cylindrical portion 28 and a distal end portion 29 also cylindrical but smaller in diameter than the portion 28.

Formed in the face of the valve 26 is an annular groove 30 in which is fixed an annular member 31 of rubber composition. The outer surface of member 31 is smooth and flush with the outer face of the valve head 26 and is adapted to seat on the flat outer end face of annular seat 23.

Pressed or otherwise fixed in a circular hole 32 drilled coaxially in the face of the valve head 26 is a plunger pin 33, the outer end of the pin being somewhat larger in diameter and having a sliding fit with the bore 22 in the valve head 26. The length of the pin 33 is such as to project slightly above the conical outer face of the hexagonal nut portion of nozzle 19 while the valve element 24 is seated on the seat ring 23.

Disposed coaxially in loose guided relation to the smooth bottom side-wall portion of bore 14 is an annular element hereinafter called retainer or spring-retainer 34. Retainer 34 has a coaxial sleeve portion 35 projecting to one side thereof and surrounded at its base end by a conical recess 36. Projecting coaxially from the opposite side of retainer 34 is a collar 37 having an inwardly sloped conical peripheral surface, which with the face of the retainer forms a V-shaped groove 38. An O-ring or grommet 39 of rubber composition is retained elastically in the groove 38 and forms a seal with the bottom surface of bore 14. The diameter of grommet 39 is such that even when compressed in sealing relation to the bottom surface of bore 14, it does not contact or seal against the side wall of bore 14.

A helical spring 40 is disposed in coaxial surrounding relation to stem 27 and sleeve 35 in interposed compressed relation between the retainer 34 and valve head 26. One end of spring 40 seats within the conical recess 36 of retainer 34 and the other end seats on the annular face of the valve head 26 surrounding stem 27. Spring 40 acts to bias valve element 24 into seated relation on the seat ring 23 unless a stronger opposing force is exerted via the pin 33 in the manner hereinafter described.

The intermediate portion 28 of the stem 27 has a sliding fit with the interior surface of sleeve 35 of retainer 34 and the end portion 29 of stem 27 extends slidably through a central bore or hole 41 in the retainer 34. An additional circular recess 42 is provided in the bottom of bore 14 to insure clearance between the casing section 11 and the end portion 29 of the stem 27 at all times. An O-ring or grommet 43 of rubber composition is interposed between the end portion 29 of stem 27 and the interior surface of sleeve 35 to provide a seal against leakage of high pressure fluid along stem 27 to the chamber formed between the retainer 34 and the bottom of bore 14, and to recess 42.

As will be seen in FIG. 1, the chamber 13 in the casing section 11 is closed by a flexible diaphragm 45, shown as of rubber composition. The periphery of the diaphragm is clamped between the end of the casing section 11 and a shoulder 46 formed inside the hollow spring casing section 12, when the two casing sections are tightly screwed together.

At the upper side of the diaphragm 45 is a rigid metallic follower plate or disc 47, the diaphragm and follower disc being secured together at the center thereof by a screw 48 which extends through registering holes 49 and 50 in the diaphragm and follower disc respectively. Screw 48 has an integral head 51 of polygonal shape for holding the screw, as with a wrench, while tightening a nut 52 thereon on the opposite side of the follower disc 47. Head 51 has a circular rib 53 on the inside surface thereof which, when nut 52 is tightened, forms a tight seal with the diaphragm 45 against leakage of fluid from chamber 13.

Contained within the chamber 54 formed within the hollow casing section 12 is a helical spring 55. Spring 55 is arranged coaxially within the casing section 12 so that one end seats on the follower disc 47 in surrounding relation to the nut 52 and the other end seats on one face of a disc-shaped spring seat 56. Spring seat 56 has a conical recess 57 in its opposite face for engagement by the rounded end of a screw 58 which has threaded engagement with a shouldered collar insert 59 retained in the upper end of the casing section 12. Screw 58 is provided, exteriorly of casing section 12, with a crossrod 60, which serves as a handle whereby the screw may be turned in or out to adjust the amount of compression of spring 55.

Chamber 54 of casing section 12 is constantly open to atmosphere through a vent port 61 to avoid any dash-pot action of the diaphragm 47.

In operation, let it first be assumed that the screw 58 of valve device 10 has been turned in to a desired position, in which the spring 55 is compressed and exerts a force via the diaphragm follower 47 and head 51 of screw 48 upon the upper end of the plunger pin 33, to thereby unseat the valve element 24 from valve seat 23 against the force of spring 40. Let it also be assumed that a suitable valve (not shown) is operated to cause the supply of high-pressure fluid, such as gas, to the inlet port 15 of valve device 10. It will be apparent that with valve element 24 unseated the high pressure gas flows from inlet port 15 via orifice 17, bore 14, bore 21 in nozzle 19, through clearance spaces between the flat side surfaces on the polygonal valve head 26 and bore 21, thence past seat ring 23 and via bore 22 and ports 25 in nozzle 19 into chamber 13. From chamber 13, the gas flows via passage 18 to the outlet port 16 and thence via a pipe or conduit (not shown) to the place at which the gas is to be utilized.

If the flow of gas from port 16 is cut off or reduced, pressure will increase in chamber 13 exerting an upward force against spring 55. The pressure of the gas in chamber 13 will continue to build up until such time as the upward pressure of the gas on the diaphragm 46 overcomes the force of spring 55. When this occurs, spring 40 causes the valve element 24 to be reseated on the seat ring 23, thus cutting off further flow of pressurized gas to chamber 13. It will be seen from the drawings that a substantially similar area on each side of valve element 24 is exposed to high pressure. Accordingly, the regulation is substantially independent of the pressure from which the gas is being reduced. It will be understood, that with the desired adjustment of screw 58, the pressure of the gas delivered by the valve device 10 may be in a relatively low range such as 15 to 20 p.s.i., while the pressurized fluid supplied to inlet port 15 of the regulating valve device may be in a relatively high range, such as 2,000 to 3,000 p.s.i.

If low pressure gas is required, there will be a drop in pressure in chamber 13, reducing the upward force on diaphragm 45 and allowing spring 55 to exert a greater downward force on pin 33. That will cause valve element 24 to move and allow gas again to flow into chamber 13 until the pressure is increased and valve element 24 again moves to a closed position. By such periodic opening and closing, the regulated pressure is closely maintained.

Let it now be further assumed that with the valve device 10 functioning to regulate the supply of gas, as before described, leakage of high-pressure gas occurs past either one or both of O-rings 43 and 39. Such leakage of gas accumulates in the chamber underneath retainer 34 and in recess 42 and eventually builds up sufficiently in pressure that the force exerted upwardly on end portion 29 of stem 27 urges the valve element 24 toward seated relation on seat ring 23, thus impeding operation thereof to regulate the delivery pressure in chamber 13. In such case, however, the trapped gas under pressure may be readily released past the valve element 24 and out through delivery port 16, simply by shutting off the supply of high-pressure gas to the inlet port 15. With the cut-off of pressurized gas effective in bore 14, the differential fluid pressure force on retainer 34 exerted by the trapped gas under pressure causes the retainer 34 to move upwardly against the force of spring 40 until such time as the retainer relieves the O-ring 39 of compression force and the O-ring 39 is restored to its normal round cross-section. Thus the seal of the O-ring 39 on the floor of the bore 14 is broken and the gas under pressure trapped beneath the retainer 34 promptly flows past the retainer into the inlet chamber portion of bore 14, since the O-ring 39 does not contact the bottom area of the side wall of bore 14. With release of gas under pressure from the chamber beneath the retainer 34, the spring 40 acts to restore the retainer again to its original position in which the O-ring 39 is seated on the bottom or floor of the bore 14 in sealed relation.

If the force exerted on pin 33 by spring 55 is such as to unseat the valve element 24 at this time, it will be seen that the pressurized gas released from the chamber beneath the retainer 34 will flow past the valve element and through bore 22 into chamber 13 and out via passage 18 and outlet port 16. Should the valve element 24 remain seated on seat ring 23 at the time the trapped gas under pressure is released from beneath the retainer 34, the restoration of full supply pressure to the inlet port 15 will cause the valve element 24 to be unseated incidental to its pressure regulating function and thereby effect flow of the released gas under pressure into chamber 13 and out through the delivery port 16.

It will accordingly be seen that the regulating valve device which I have provided functions to release leakage gas under pressure via normal delivery channels through the valve device. Thus the necessity for a leakage port to atmosphere is obviated with the consequent advantage that accumulation of dirt in the leakage port is avoided and possible hazard in the case of an explosive or toxic gas is avoided.

Moreover, since the retainer 34 and O-ring 39 fit the bore 14 loosely, the retainer can shift position slightly to eliminate binding that could result if valve element 24 and its stem 27 were rigidly guided at both ends and some non-concentric machining of parts existed. Also, the loose fit of retainer 34 in the bore 14 insures perfect seating of valve element 24 on its seat 23, and allows a closer tolerance in the fit between stem end portion 29 and its guiding bore 41 in the retainer 34. The possibility of extrusion failure of O-ring 43 under high pressure conditions is thus lessened.

I claim:

1. In a pressure regulating valve device having a casing embodying an inlet chamber and an outlet chamber, a nozzle member fixed in said casing and providing fluid communication from the said inlet chamber to said outlet chamber, a valve member disposed within the inlet chamber and cooperating with a seat on said nozzle member to open and close said fluid communication, and fluid pressure responsive means subject to the opposing forces of a spring means and the fluid pressure in said outlet chamber for controlling the position of said valve member with respect to the seat on said nozzle member, wherein the improvement comprises an annular retainer member guidably disposed in a portion of said inlet chamber and having a sleeve portion for guiding said valve member, an O-ring on said retainer member providing a seal with the floor of said inlet chamber, spring means interposed between said valve member and said retainer member and yieldable to permit movement of said retainer member toward said valve member to break the seal of the said O-ring with the floor of said inlet chamber and permit release flow past said retainer of fluid pressure trapped by said retainer.

2. In a pressure regulating valve device according to claim 1, wherein said valve member has a stem disposed coaxially and in telescopic relation with respect to the sleeve portion of said retainer member and wherein a second O-ring is interposed in sealing relation between a portion of the stem of said valve member and the sleeve portion of said retainer member.

3. In a pressure regulating valve device according to claim 2, wherein said retainer member is subject opposingly to the fluid pressure in said inlet chamber and the accumulated fluid pressure leaking past said second O-ring along the stem of the valve member, and wherein said retainer is shifted toward said valve member to release accumulated fluid pressure leaking past said second O-ring by the fluid pressure differential acting thereon in consequence of reduction of the supply fluid pressure in said inlet chamber.

* * * * *

UNITED STATES PATENT OFFICE
CERTIFICATE OF CORRECTION

Patent No. 3,759,294    Dated September 18, 1973

Inventor(s) Robert M. Kongelka

It is certified that error appears in the above-identified patent and that said Letters Patent are hereby corrected as shown below:

Column 1, line 27, "NOv." should read --Nov.--.

Column 2, line 4, "connectable" should read --passage--.

Column 2, line 5, "connectible" should read --connectable--.

Column 2, line 33, "in" should read --is-- (second occurrence).

Column 2, line 43, after "valve" insert --head--.

Signed and sealed this 5th day of March 1974.

(SEAL)
Attest:

EDWARD M. FLETCHER, JR.
Attesting Officer

C. MARSHALL DANN
Commissioner of Patents